Dec. 1, 1964     E. E. HESTON     3,158,900
EXTRUDER
Filed June 12, 1962

INVENTOR.
EUGENE E. HESTON
BY
Oberlin, Maky & Donnelly
ATTORNEYS

United States Patent Office 3,158,900
Patented Dec. 1, 1964

3,158,900
EXTRUDER
Eugene E. Heston, Akron, Ohio, assignor to
NRM Corporation, a corporation of Ohio
Filed June 12, 1962, Ser. No. 201,927
6 Claims. (Cl. 18—12)

The present invention relates generally as indicated to an extruder and, more particularly, to improvements in a screw-type extruder for thermoplastic and like material.

A principal object of this invention is to provide an extruder which has at one or more places along the length of the screw an adjustable restriction effective to build up back pressure on the material to desired value to effect efficient heating, mixing, and smearing of the material.

It is another object of this invention to provide an extruder in which the adjustable restriction promotes mixing of the material that is fed thereto by the feed screw.

Another object of this invention is to provide an extruder which has an adjustable restriction as aforesaid, disposed upstream of a cylinder vent, whereby material with a high moisture content may devolatilize after it has passed the adjustable restriction, the adjustable restriction being upstream of the vent a distance such that this material is confined before it reaches the vent to thus minimize the substantial puffing action which occurs when the restriction is located adjacent the vent.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principle of the invention may be employed.

Figure 1:
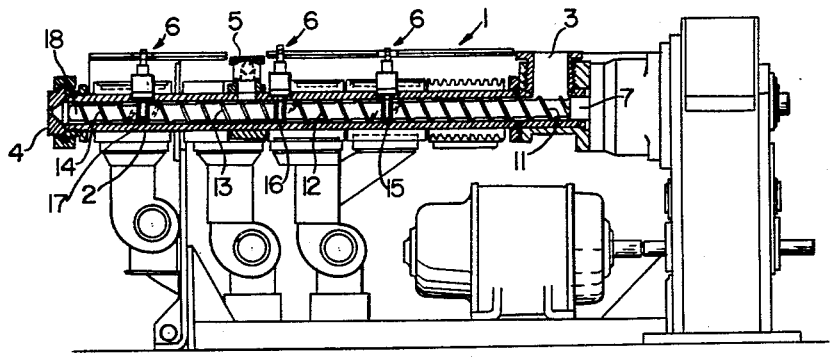
FIG. 1 is a side elevation view, partly in cross-section, showing an extruder embodying the present invention.

Referring now more particularly to the drawing, and first to FIG. 1, the extruder 1 herein shown comprises a cylinder 2 having a feed opening 3 adjacent one end, an extrusion die 4 at the other end, and a vent box 5 between the ends thereof and usually closer to the discharge end than to the feed end.

Figure 2:
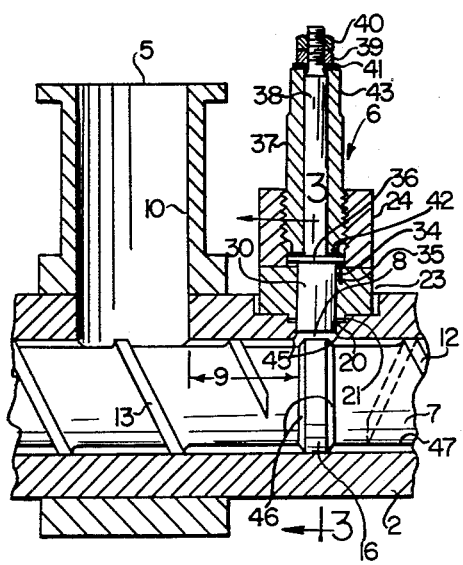
FIG. 2 is a fragmentary longitudinal cross-section view taken along the vertical plane denoted by the line 2—2, FIG. 3.
Figure 3:
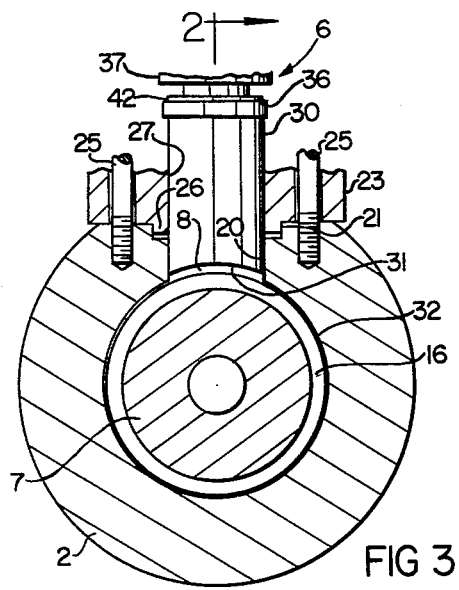
FIG. 3 is an enlarged transverse cross-section view taken substantially along the line 3—3, FIG. 2.

In the present case the cylinder 2 also has spaced therealong one or more, herein three, adjustable valve assemblies 6 to define with the feed screw 7 that is rotatable in the cylinder 2 a corresponding number of adjustable restrictions 8 to impede the advance of the material from the feed opening 3 toward the die 4. When only one adjustable valve assembly is used, it preferably will be disposed at a position spaced substantialy upstream from the nearest side of the vent box opening 10 as clearly shown at 9 in FIG. 2. In the present case, the other two adjustable valve assemblies 6 are shown as being located approximately midway between the feed opening 3 and the vent box 5 and approximately midway between the die 4 and the vent box 5.

The feed screw 7 has successive helical flights 11, 12, 13, and 14 respectively extending from the feed opening 3 to a point short of the first circular rib 15 which cooperates with the first valve assembly 6; extending between the first and second circular ribs 15 and 16 and terminating short distances therefrom, the second rib 16 cooperating with the second valve assembly 6; extending between the second and third circular ribs 16 and 17 and terminating short distances therefrom, the third rib 17 cooperating with the third valve assembly 6; and extending a short distance away from the third rib 17 to a point short of the nose 18 of the feed screw 7.

Because the three valve assemblies 6 and the three circular ribs 15, 16, and 17 may be identical, the ensuing description will relate to the second valve assembly 6 and the second circular rib 16 which is disposed upstream of the vent box 5.

At the location of the rib 16 the cylinder 2 has a radial bore 20 and counterbore 21 and is machined for mounting of the two-part valve housing 23–24 thereon as by screws 25, the lower housing part 23 having an annular lip or pilot 26 which extends into the counterbore 21 to locate the bore 27 of housing part 23 coaxially of the bore 20.

Axially reciprocable in the bore 27 of housing part 23 and in bore 20, is a cylindrical valve member 30 having an inner concave cylindrical face 31 of radius equal to the radius of the main cylinder bore 32. The valve member 30 is held against rotation as by means of the axially extending pin 34 thereof being slidable in an axial hole 35 formed in the housing part 23. The valve member 30 also has a stop shoulder 36 and when the shoulder abuts the housing part 23, the valve member 30 is at its innermost position flush with the cylinder bore 32. This innermost position of the valve member provides the maximum restriction since no material can flow except through the minute annular gap between the outside diameter of the circular rib 16 and the cylinder bore 32 of which a portion is made up of the flush inner end face 31 of the valve member 30. For example, in a 3½″ extruder, that is, an extruder having a feed screw 7 with flights 11 to 14 and ribs 15, 16, and 17 of 3½″ diameter, the radial clearance between the outside diameter of the flights and circular ribs and the cylinder bore is generally on the order of .005″.

The valve member 30 aforesaid, is radially adjusted by means of a bushing 37 which has threaded engagement with the housing part 24. The stem 38 of the valve member 30 is threaded and has jam nuts 39 and 40 thereon with a thrust washer 41 interposed between the bottom nut 39 and the upper end of the bushing 37 and a similar thrust washer 42 is interposed between the lower end of the bushing 37 and the shoulder 36 of the valve member 30. Thus, when the bushing 37 is turned, as with a suitable wrench engaging the wrench flats 43 thereof, in opposite directions, the valve member 30 is caused to move radially inwardly or outwardly of cylinder 2 to vary the size of the radial gap 8 between the outside diameter of the circular rib 16 and the inner end face 31 of the valve member 30.

The radial bore 20 of the cylinder 2 preferably has rounded, or beveled leading and trailing edges 45 to cooperate with the beveled edges 46 of the circular rib 16.

Having adjusted the valve assemblies 6 herein, desired magnitude of back pressure on the material is built up in the early stages between the feed opening 3 and the first valve assembly 6 to promote efficient heating, mixing, and smearing of the material and then there is a greater or less back pressure built up in the portion of the extruder 1 between the first and second valve assemblies 6 and, similarly, between the second and third valve assemblies 6 while the material is devolatilized and trapped gas bubbles allowed to escape as the material passes the vent box 5. Of course, the final back pressure is determined by the relative flow capacities of the extrusion die 4 and the third valve assembly 6.

In the case of polyethylene, for example, it has been found that this material with 2 to 3% moisture can be effectively devolatilized using even the single valve assembly 6 upstream of the vent box 5. By way of example, when the nearest points of the vent opening 10 and the radial bore 20 of the cylinder is about 3¼" to about 3½" for a 3½" extruder, the material when it emerges from the restriction 8 between the circular rib 16 and the valve member 30 is ironed out between the hub 47 of the feed screw 7 and the surrounding cylinder bore 32 so as to minimize puffing action which would otherwise occur with this material if the circular rib 16 is spaced closer than about one-half the diameter of the cylinder bore 32 with respect to the nearest edge of the vent opening 10. Accordingly, it is preferred to maintain this distance 9 from about one-half to about the diameter of the cylinder bore 32.

An important feature of the present invention is that in connection with each adjustable restriction 8 all of the material being advanced by the preceding flight 11, 12, or 13 is caused to flow through a gap 8 of constant circumferential width (equivalent to the diameter of the valve member 30) and of desired radial thickness. This provides for very efficient mixing of the material, since, as the material is fed along the feed screw 7 it tends to separate into different strata with the most highly plasticized material adjacent to the front side of the flight 11, 12, or 13 and the less highly plasticized or unplasticized material adjacent the rear side of the flight. Accordingly, as the stratified material is forced through the restricted opening 8, the stratification will be broken down and the less highly plasticized or unplasticized material will be mixed with the plasticized material, thus making the former more susceptible to plasticization on the downstream sides of the circular ribs.

In conclusion, it can be seen that the present invention provides an inexpensive and efficient valve arrangement which, by reason of its adjustable restriction, builds up desired back pressures upstream thereof for efficient heating, mixing and smearing of the material and, in addition, by reason of the provision of the circular ribs 15, 16, and 17 and relatively narrow circumferential widths of the respective restrictions 8, and with the circular ribs 15, 16, and 17 being disposed in axially spaced relation with respect to the ends of the upstream and downstream flights 11-12, 12-13, and 13-14 respectively there is destratification of the material so that the plasticized and unplasticized material is blended as it flows from the upstream side to the downstream side of each adjustable restriction 8.

Other modes of applying the principle of the invention may be employed, change being made as regards the details described, provided the features stated in any of the following claims, or the equivalent of such, be employed.

I therefore particularly point out and distinctly claim as my invention:

1. An extruder comprising a cylinder having feed and discharge openings; a feed screw rotatable in said cylinder and having a helical flight, and a rib axially spaced from the end of said flight blocking the advance of material by said flight from said feed opening toward said discharge opening; and a valve member in said cylinder defining with a minor portion of the circumference of said rib a radial gap through which all of the material is advanced by said flight.

2. The extruder of claim 1 wherein said valve member has an inner concave face of radius substantially equal to that of said rib and of the bore of said cylinder; and wherein means are provided in said cylinder for radially adjusting said valve member thus to vary the radial width of said gap.

3. The extruder of claim 1 wherein said cylinder has a vent opening axially spaced downstream of said rib at least about one half the diameter of said rib.

4. An extruder comprising a cylinder having feed and discharge openings; a feed screw rotatable in said cylinder and having successive helical flights with an intervening rib axially spaced from the adjacent ends of said flights that blocks advance of materail by said flights from said feed opening toward said discharge opening; and a valve member in said cylinder defining with a minor portion of the circumference of said rib a radial gap through which all of the material is advanced by said flights.

5. The extruder of claim 4 wherein said valve member has an inner concave face of radius substantially equal to that of said rib and of the bore of said cylinder; and wherein means are provided in said cylinder for radially adjusting said valve member thus to vary the radial width of said gap.

6. The extruder of claim 4 wherein said cylinder has a vent opening axially spaced downstream of said rib at least about one-half the diameter of said rib.

References Cited in the file of this patent

UNITED STATES PATENTS

| | | |
|---|---|---|
| Re. 23,948 | Fuller | Feb. 15, 1955 |
| 2,519,014 | Bankey | Aug. 15, 1950 |
| 2,736,058 | Delheim | Feb. 28, 1956 |
| 2,970,341 | Mallory et al. | Feb. 7, 1961 |
| 3,023,456 | Palfrey | Mar. 6, 1962 |
| 3,035,306 | Rossiter | May 22, 1962 |